(12) United States Patent
Bitran et al.

(10) Patent No.: US 9,237,572 B2
(45) Date of Patent: Jan. 12, 2016

(54) MITIGATION OF INTERFERENCE BETWEEN COMMUNICATION TERMINALS IN TD-LTE

(75) Inventors: Yigal Bitran, Ramat Hasharon (IL); Dima Feldman, Ramat Hasharon (IL); Ariel Yagil, Ein Sarid (IL)

(73) Assignee: ALTAIR SEMICONDUCTOR LTD., Mod-Hasharon (IL)

( * ) Notice: Subject to any disclaimer, the term of this patent is extended or adjusted under 35 U.S.C. 154(b) by 105 days.

(21) Appl. No.: 14/117,639

(22) PCT Filed: Jun. 11, 2012

(86) PCT No.: PCT/IB2012/052945
§ 371 (c)(1),
(2), (4) Date: Nov. 14, 2013

(87) PCT Pub. No.: WO2012/172476
PCT Pub. Date: Dec. 20, 2012

(65) Prior Publication Data
US 2014/0177606 A1    Jun. 26, 2014

Related U.S. Application Data

(60) Provisional application No. 61/496,004, filed on Jun. 12, 2011.

(51) Int. Cl.
*H04W 72/08*    (2009.01)
*H04W 72/04*    (2009.01)
(Continued)

(52) U.S. Cl.
CPC .......... *H04W 72/0446* (2013.01); *H04W 56/00* (2013.01); *H04W 56/0015* (2013.01); *H04W 72/082* (2013.01); *H04W 72/1231* (2013.01)

(58) Field of Classification Search
None
See application file for complete search history.

(56) References Cited

U.S. PATENT DOCUMENTS

| 6,130,886 A | 10/2000 | Ketseoglou et al. |
| 6,985,432 B1 | 1/2006 | Hadad et al. |

(Continued)

FOREIGN PATENT DOCUMENTS

| WO | 2010100558 A2 | 9/2010 | |
| WO | WO 2010100558 A2 * | 9/2010 | ............... H04B 7/26 |
| WO | 2012093349 A2 | 7/2012 | |
| WO | 2012172476 A2 | 12/2012 | |

OTHER PUBLICATIONS

International Application PCT/IB2012/050015 Search Report dated May 18, 2012.

(Continued)

*Primary Examiner* — Marcus R Smith
*Assistant Examiner* — Lakeram Jangbahadur
(74) *Attorney, Agent, or Firm* — D. Kligler I.P. Services Ltd.

(57) ABSTRACT

A method for communication includes communicating between one or more first base stations (28A) and first wireless communication terminals (32A) using a first alternating pattern (56) of downlink time intervals and uplink time intervals. A time offset is selected between the first alternating pattern and a second alternating pattern (60), which is used by one or more second base stations (28B) for communicating with second wireless communication terminals (32B), so as to minimize impact of interference between the first and second wireless communication terminals. The first base stations are synchronized relative to the second base stations according to the selected time offset.

16 Claims, 2 Drawing Sheets

(51) Int. Cl.
*H04W 56/00* (2009.01)
*H04W 72/12* (2009.01)

(56) References Cited

U.S. PATENT DOCUMENTS

| | | | |
|---|---|---|---|
| 7,133,646 | B1 | 11/2006 | Miao |
| 7,133,669 | B2 | 11/2006 | Nair et al. |
| 7,289,804 | B2 | 10/2007 | Kim |
| 7,363,051 | B2 | 4/2008 | Bridgelall |
| 7,406,296 | B2 | 7/2008 | Haartsen et al. |
| 7,430,421 | B2 | 9/2008 | Park |
| 7,542,728 | B2 | 6/2009 | Bitran et al. |
| 7,545,787 | B2 | 6/2009 | Bitran et al. |
| 7,567,820 | B2 | 7/2009 | Bitran |
| 7,688,784 | B2 | 3/2010 | Bitran |
| 7,822,436 | B2 | 10/2010 | Bitran |
| 7,881,252 | B2 | 2/2011 | Bitran |
| 7,904,112 | B2 | 3/2011 | Bitran et al. |
| 8,121,144 | B2 | 2/2012 | Bitran |
| 8,160,001 | B2 | 4/2012 | Bitran |
| 2002/0136233 | A1 | 9/2002 | Chen et al. |
| 2002/0181509 | A1 | 12/2002 | Mody et al. |
| 2003/0054788 | A1 | 3/2003 | Sugar et al. |
| 2003/0169824 | A1 | 9/2003 | Chayat |
| 2004/0029619 | A1 | 2/2004 | Liang et al. |
| 2004/0162106 | A1 | 8/2004 | Monroe et al. |
| 2005/0020299 | A1 | 1/2005 | Malone et al. |
| 2005/0025093 | A1 | 2/2005 | Yun et al. |
| 2005/0059347 | A1 | 3/2005 | Haartsen |
| 2005/0101261 | A1 | 5/2005 | Weinzweig et al. |
| 2005/0128990 | A1 | 6/2005 | Eom et al. |
| 2005/0195786 | A1 | 9/2005 | Shpak |
| 2006/0121946 | A1* | 6/2006 | Walton et al. ............... 455/561 |
| 2006/0198476 | A1 | 9/2006 | Palaskas et al. |
| 2006/0221917 | A1 | 10/2006 | McRae |
| 2007/0066359 | A1 | 3/2007 | Zhuang |
| 2007/0076649 | A1 | 4/2007 | Lin et al. |
| 2007/0104145 | A1 | 5/2007 | Jan |
| 2007/0124478 | A1 | 5/2007 | Abdelhamid et al. |
| 2007/0140256 | A1 | 6/2007 | Yaqub |
| 2007/0165594 | A1 | 7/2007 | Heinle et al. |
| 2007/0280096 | A1 | 12/2007 | Yanover et al. |
| 2008/0132180 | A1 | 6/2008 | Manicone |
| 2008/0167031 | A1 | 7/2008 | Sorber et al. |
| 2008/0205365 | A1 | 8/2008 | Russell et al. |
| 2008/0233875 | A1 | 9/2008 | Desai et al. |
| 2009/0054009 | A1 | 2/2009 | Yang et al. |
| 2009/0081962 | A1 | 3/2009 | Sohrabi et al. |
| 2009/0083601 | A1 | 3/2009 | Gorokhov et al. |
| 2009/0111500 | A1 | 4/2009 | Sudak et al. |
| 2009/0285167 | A1 | 11/2009 | Hirsch et al. |
| 2010/0034113 | A1 | 2/2010 | Marinier et al. |
| 2010/0061326 | A1 | 3/2010 | Lee et al. |
| 2010/0150069 | A1 | 6/2010 | Fang et al. |
| 2010/0255852 | A1 | 10/2010 | Chen et al. |
| 2010/0284289 | A1* | 11/2010 | Suo et al. ............... 370/252 |
| 2010/0309865 | A1 | 12/2010 | Kimura |
| 2010/0329236 | A1 | 12/2010 | Sampath et al. |
| 2011/0032853 | A1* | 2/2011 | Moon et al. ............... 370/280 |

OTHER PUBLICATIONS

Philips Semiconductors, "How 802.11b/g WLAN and Bluetooth Can Play", White Paper, Koninklijke Philips Electronics N.V., 5 pages, Netherlands, 2005.

Texas Instruments Incorporated, "Wireless Performance Optimization Solutions: Bluetooth and 802.11 coexistence", 4 pages, USA, 2003.

Bluetooth, "Specification of the Bluetooth System: Master Table of Contents & Compliance Requirements: Core Package Version 2.0 + EDR", 131 pages, Nov. 4, 2004.

International Application PCT/IL2007/000147 Search Report dated Sep. 12, 2008.

Gesbert et al., "From Theory to Practice: An Overview of MIMO Space-Time Coded Wireless Systems", IEEE Journal on Selected Areas in Communications, vol. 21, No. 3, pp. 281-302, Apr. 2003.

IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, 895 pages, Oct. 1, 2004.

IEEE Standard 802.16e-2005 for Local and metropolitan area networks, "Part 16: Air Interface for Fixed Broadband Wireless Access Systems; Amendment 2 and Corrigendum 1", Physical and Medium Access Control Layers for Combined Fixed and Mobile Operation in Licensed Bands, Amendment and Corrigendum to IEEE Standard 802.16—2004, IEEE Computer Society and IEE Microwave Theory and Techniques Society, 864 pages, Feb. 28, 2006.

IEEE Inc., "A compilation based on IEEE Standard 802.11—1999 (revision 2003) and its amendments", IEEE Wireless LAN Edition, IEEE Press, 706 pages, USA, 2003.

Tomchik J., "QFDD and QTDD: Proposed Draft Air Interface Specification", IEEE 802.20 Working Group on Mobile Broadband Wireless Access, Qualcomm, Inc., 624 pages, USA, Oct. 28, 2005.

Altair Semiconductor, "TRIMAX: Coexistence of WiMAX, Bluetooth and WLAN in converged handsets (Non NDS version)", White paper 0012, Revision 1.00, 12 pages, Jul. 2006.

International Application PCT/IB2012/052945 Search Report dated Oct. 9, 2012.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 9)", V9.3.0, 48 pages, Jun. 2010.

3GPP TS 36.211, "Technical Specification 3rd Generation Partnership Project; Technical Specification Group Radio Access Network; Evolved Universal Terrestrial Radio Access (E-UTRA); Physical Channels and Modulation (Release 8)", V8.6.0, 83 pages, Mar. 2009.

3GPP TS 36.101, "Technical Specification 3rd Generation Partnership Project; Technical Specification Group Radio Access Network; Evolved Universal Terrestrial Radio Access (E-UTRA); User Equipment (UE) radio transmission and reception (Release 10)", 225 pages, Apr. 2011.

3GPP TS 36.213, "Technical Specification 3rd Generation Partnership Project; Technical Specification Group Radio Access Network; Evolved Universal Terrestrial Radio Access (E-UTRA); Physical layer procedures (Release 10)", V10.1.0, 115 pages, Mar. 2011.

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", 536 pages, Oct. 29, 2009.

IEEE Standard 802.11-2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications", 1232 pages, Jun. 12, 2007.

* cited by examiner

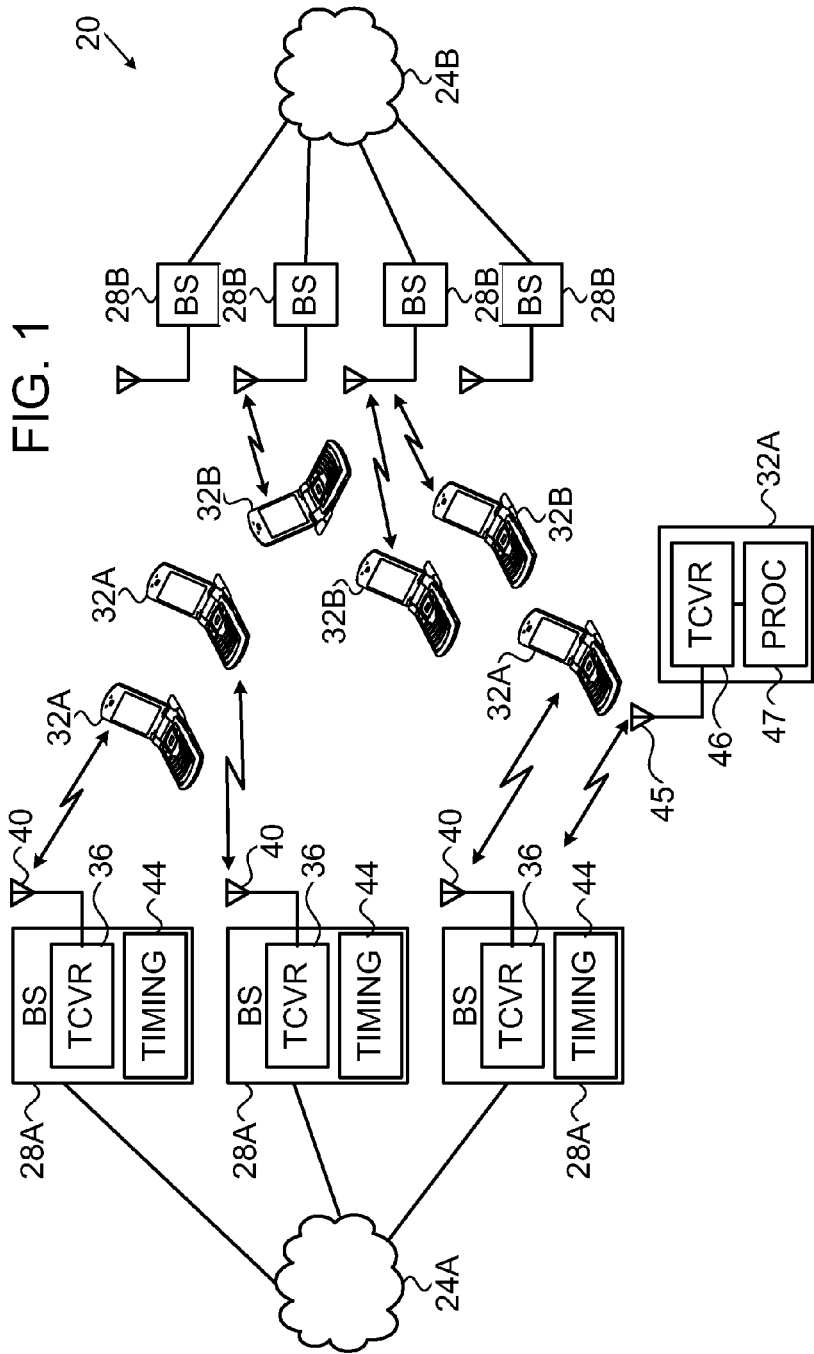
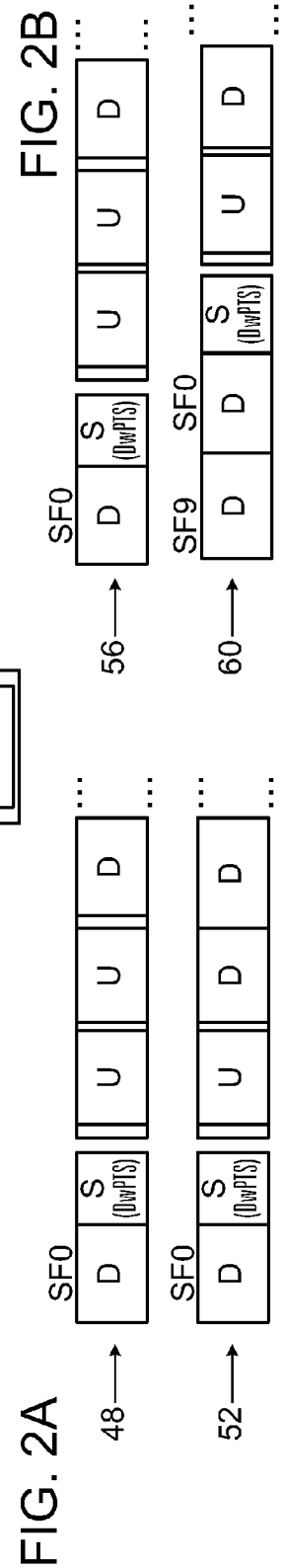

MITIGATION OF INTERFERENCE BETWEEN COMMUNICATION TERMINALS IN TD-LTE

CROSS-REFERENCE TO RELATED APPLICATIONS

This application claims the benefit of U.S. Provisional Patent Application 61/496,004, filed Jun. 12, 2011, whose disclosure is incorporated herein by reference.

FIELD OF THE INVENTION

The present invention relates generally to wireless communication, and particularly to methods and systems for mitigating interference between wireless communication terminals.

BACKGROUND OF THE INVENTION

Some wireless communication protocols define alternating patterns of uplink (UL) and downlink (DL) time intervals for communication between base stations and wireless communication terminals. UL/DL patterns for Time-Division Long-Term Evolution (TD-LTE) systems are defined, for example, by the Third Generation Partnership Project (3GPP) in of 3GPP Technical Specification 36.211, entitled "Technical Specification Group Radio Access Network; Evolved Universal Terrestrial Radio Access (EUTRA); Physical Channels and Modulation (Release 8)," (3GPP TS 36.211), version 8.6.0, March 2009, which is incorporated herein by reference. Section 4.2 of this specification refers to UL/DL patterns for TD-LTE (referred to as "Frame structure type 2").

SUMMARY OF THE INVENTION

An embodiment of the present invention provides a method for communication. The method includes communicating between one or more first base stations and first wireless communication terminals using a first alternating pattern of downlink time intervals and uplink time intervals. A time offset is selected between the first alternating pattern and a second alternating pattern, which is used by one or more second base stations for communicating with second wireless communication terminals, so as to minimize impact of interference between the first and second wireless communication terminals. The first base stations are synchronized relative to the second base stations according to the selected time offset.

In some embodiments, the first and second alternating patterns are specified in accordance with a Time-Division Long-Term Evolution (TD-LTE) specification, and the downlink time intervals and the uplink time intervals include TD-LTE sub-frames. In some embodiments, each of the first and second alternating patterns includes one or more uplink sub-frames and one or more downlink sub-frames, and selecting the time offset includes minimizing an overlap between the uplink sub-frames in one of the first and second alternating patterns and the downlink sub-frames in the other of the first and second alternating patterns.

In some disclosed embodiments, each of the first and second alternating patterns includes one or more uplink sub-frames, one or more downlink sub-frames, and one or more special sub-frames containing respective uplink and downlink regions, and the method includes applying an interference mitigation process to reduce the interference during the special sub-frames.

In an example embodiment, the special sub-frames contain synchronization signals, and applying the interference mitigation process includes reducing the interference to the synchronization signals. In another embodiment, the special sub-frames contain synchronization signals, and applying the interference mitigation process includes obtaining synchronization using alternative means other than the synchronization signals.

In yet another embodiment, applying the interference mitigation process includes distinguishing between a first subset of the special sub-frames that are subjected to the interference and a second subset of the special sub-frames that are not subjected to the interference, and processing only the special sub-frames in the second subset. In still another embodiment, applying the interference mitigation process includes distinguishing between a first subset of the special sub-frames that are subjected to the interference and a second subset of the special sub-frames that are not subjected to the interference, and activating the interference mitigation process only during the special sub-frames in the first subset.

In an embodiment, a given wireless communication terminal includes multiple receive antennas, and the method includes canceling the interference by weighting respective signals received via the multiple receive antennas. In another embodiment, the method includes allocating data transmissions to the first terminals only during predefined times during the first alternating pattern in which the interference from the second alternating pattern is known not to be present.

In another embodiment, the method includes communicating with the first terminals using a first communication scheme during predefined times in the first alternating pattern in which the interference from the second alternating pattern is known to be present, and using a second communication scheme, less robust than the first scheme, outside the predefined times.

In another embodiment, the method includes setting in the first terminals a first receiver chain setting during predefined times in the first alternating pattern in which the interference from the second alternating pattern is known to be present, and setting a second receiver chain setting, less robust than the first setting, outside the predefined times.

There is additionally provided, in accordance with an embodiment of the present invention, a communication apparatus including one or more first transceivers and at least one timing unit. The first transceivers are configured to communicate with first wireless communication terminals using a first alternating pattern of downlink time intervals and uplink time intervals. The timing unit is configured to synchronize the first alternating pattern relative to a second alternating pattern that is used by one or more second transceivers for communicating with second wireless communication terminals, while applying between the first and second patterns a time offset selected so as to minimize impact of interference between the first and second wireless communication terminals.

There is also provided, in accordance with an embodiment of the present invention, a wireless communication terminal including a transceiver and a processor. The transceiver is configured to communicate with a first base station using a first alternating pattern of downlink time intervals and uplink time intervals, such that the first alternating pattern is synchronized relative to a second alternating pattern that is used by a second base station for communicating with at least another wireless communication terminal while applying between the first and second patterns a time offset selected so as to minimize impact of interference between the terminal and the other terminal. The processor is configured to apply an interference mitigation process for reducing residual interference caused by the second pattern.

The present invention will be more fully understood from the following detailed description of the embodiments thereof, taken together with the drawings in which:

BRIEF DESCRIPTION OF THE DRAWINGS

FIG. 1 is a block diagram that schematically illustrates a wireless communication system, in accordance with an embodiment of the present invention;

FIGS. 2A and 2B are diagrams that schematically illustrate alternating UL/DL patterns, in accordance with an embodiment of the present invention.

DETAILED DESCRIPTION OF EMBODIMENTS

Overview

Figure 3:
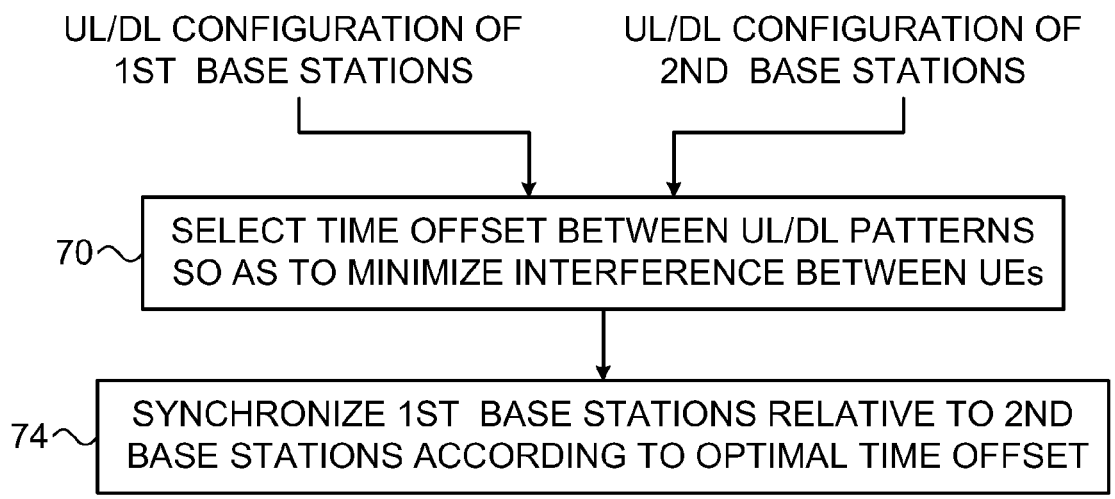
FIG. 3 is a flow chart that schematically illustrates a method for synchronization between base stations, in accordance with an embodiment of the present invention.

When two wireless communication terminals (e.g., cellular phones) are located in proximity to one another, transmission of one terminal may interfere with reception of the other, even if the terminals operate on different frequencies. For terminals that communicate with their respective base stations using a Time Division Duplex (TDD) protocol, such interference may occur when a downlink interval of one terminal overlaps an uplink interval of the other. The interfering terminal is referred to as an aggressor terminal, and the terminal subjected to the interference is referred to as a victim terminal.

The Time-Division Long-Term Evolution (TD-LTE) standard, for example, specifies seven possible uplink/downlink configurations, i.e., seven different ways to divide the communication frame into patterns of uplink and downlink sub-frames. In a given network, the uplink/downlink configuration is typically chosen according the ratio of uplink/downlink traffic. For example, networks that are dominated by Voice over IP (VoIP) traffic tend to select more symmetric uplink/downlink configurations than networks having high internet browsing traffic.

If two nearby TD-LTE terminals use different uplink/downlink configurations, the start times of the frame will typically be synchronized, but some downlink sub-frames of one terminal may overlap uplink sub-frames of the other. In some scenarios, the resulting interference may block the communication of the victim terminal completely. Similar interference scenarios may also occur between nearby base stations that use different uplink/downlink configurations.

Embodiments of the present invention that are described herein provide methods and systems for mitigating the above-described interference scenarios. In some embodiments, a group of (one or more) base stations communicates with wireless terminals using a certain alternating pattern of uplink and downlink time intervals, and another group of (one or more) base stations communicates using a different alternating pattern.

The patterns of the two groups of base stations are synchronized to one another, but a certain time offset is applied between them. The time offset is selected so as to minimize the impact of interference between terminals associated with the respective groups. For example, when one group of TD-LTE base stations communicates using uplink/downlink configuration 1, and the other group communicates using uplink/downlink configuration 2, as specified in the TD-LTE standard, a time offset of one sub-frame minimizes the interference between terminals. In these embodiments, a LTE frame is 10 ms long and each sub-frame is 1 ms long.

In addition to uplink and downlink sub-frames, the TD-LTE frame comprises special sub-frames containing uplink and downlink regions used for control and sometimes data transfer (The downlink region is typically used for control, data and synchronization, while the uplink region is typically used for channel sounding and random access). The seven TD-LTE uplink/downlink configurations specify the positions of the special sub-frames in the frame.

In some embodiments, the selected time offset eliminates overlap between downlink sub-frames of the victim terminal and uplink sub-frames of the aggressor terminal, but some interference may remain during the special sub-frames. Several example techniques for mitigating this residual interference are described herein. Techniques for mitigating residual interference between nearby base stations are also described.

In summary, the disclosed techniques reduce interference between nearby terminals, as well as between nearby base stations, for example by introducing a time offset between the alternating uplink/downlink patterns of the base stations. These techniques can be used, for example, by multiple cellular service providers for deploying multiple networks using different uplink/downlink patterns in the same geographical area, while minimizing interference between the networks.

System Description

FIG. 1 is a block diagram that schematically illustrates a wireless communication system 20, in accordance with an embodiment of the present invention. The embodiment of FIG. 1 shows two wireless communication networks 24A and 24B. In the present example, both networks comprise cellular networks that operate in accordance with the TD-LTE specifications. In alternative embodiments, however, the disclosed techniques can be used with networks that operate in accordance with various other wireless communication protocols, or even within a single network. For example, the disclosed techniques can also be used in TD-SCDMA networks as defined in the 3GPP 25.221 specifications.

Network 24A comprises multiple base stations 28A (eNodeB in LTE terminology), which communicate with wireless communication terminals 32A (User Equipment—UE—in LTE terminology). Network 24B comprises multiple base stations 28B, which communicate with wireless communication terminals 32B. Terminals 32A and 32B may comprise, for example, cellular phones, wireless-enabled mobile computing devices, or any other suitable type of wireless communication terminals.

In some embodiments, base stations 28A of network 24A communicate with terminals 32A using an alternating pattern of uplink (UL) and downlink (DL) time intervals. Base stations 28B of network 24B communicate with terminals 32B using an alternating pattern that is different from the pattern used by base stations 28A.

The TD-LTE standard, for example, specifies seven possible UL/DL configurations. Each UL/DL configuration divides the communication frame into a respective pattern of UL and DL sub-frames (SF). In some embodiments, networks 24A and 24B apply UL/DL configurations that are different from one another. For example, networks 24A and 24B may be deployed and operated by different service providers who choose to apply different UL/DL configurations.

As will be explained in detail below, the use of differing UL/DL configurations may cause interference between terminals 32A and terminals 32B. The interference is particularly severe if terminals from different networks are located in close proximity to one another. In some embodiments, base stations 28A reduce this interference by synchronizing to base stations 28B while applying a certain time offset. The time offset is selected so as to minimize the level of interference between terminals 32A and 32B.

In some embodiments, each base station 28A comprises a transceiver 36 that communicates via an antenna 40 with one or more terminals 32A in accordance with the TD-LTE specification. Each base station 32A further comprises a timing unit 44 that generates timing signals for the base station. In particular, the timing units apply the selected time offset so as to minimize the interference between terminals 32A and 32B. Typically, each terminal comprises a transceiver 46 for communicating via an antenna 45 with one of the base stations, and a processor 47 that carries out the various processing and management functions of the terminal.

The system configuration of system 20 shown in FIG. 1 is an example configuration, which is chosen purely for the sake of conceptual clarity. In alternative embodiments, any other suitable system configuration can also be used. For example, instead of using multiple timing units 44, network 24A may comprise a single centralized timing unit that introduces the selected time offset and synchronizes the multiple base stations 28A. Although the embodiments described herein refer mainly to two networks that use different UL/DL configurations, the disclosed techniques can be used in any other suitable scenario in which base stations use different patterns of UL and DL intervals.

The elements of system 20 may be implemented in hardware, in software, or using a combination of hardware and software elements. In some embodiments, certain functions of system 20 can be implemented using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Interference Between Wireless Terminals That Use Different UL/DL Patterns

The TD-LTE standard specifies seven possible UL/DL configurations:

| UL/DL conf # | Period (ms) | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

As can be seen in the table above, in each UL/DL configuration the frame is divided into ten sub-frames. Each sub-frame may be defined as an uplink sub-frame (denoted U) for transmission from the terminals to the base stations, a downlink sub-frame (denoted D) for transmission from the base stations to the terminals, or a special sub-frame (denoted S).

Each special sub-frame comprises a downlink region (referred to as Downlink Pilot Time Slot—DwPTS) that can be used for downlink control, data and synchronization, a guard period (GP), and an uplink region (referred to as Uplink Pilot Time Slot—UpPTS) that can be used for sounding and random access (PRACH) but not for data or control.

Consider a terminal 32A of network 24A and a terminal 32B of network 24B that are located in close proximity to one another. The assumption is that the base stations in networks 24A and 24B are frame-synchronized to one another, i.e., that the frame start times in the two networks coincide.

If the two networks (and thus the two terminals) use the same UL/DL configuration, interference from one terminal to the other is minimal, because the terminals either transmit together or receive together. Since the two networks use the same UL/DL configuration, there are no sub-frames in which one terminal transmits and the other receives. (Some interference may occur, for example, if the special sub-frame configuration differs from one network to the other, or due to propagation time differences, but this interference is usually minor.)

If, on the other hand, networks 24A and 24B use different UL/DL configurations, an UL sub-frame of one terminal may coincide with a DL sub-frame of a nearby terminal from the other network. During this sub-frame, the receiving terminal (referred to as a victim terminal) may suffer severe interference from the transmitting terminal (referred to as an aggressor terminal).

FIG. 2A is a diagram that schematically illustrates example UL/DL configurations, in order to demonstrate this effect. FIG. 2A shows UL/DL configurations 48 and 52, which are used by networks 24A and 24B, respectively. In this example, network 24A uses UL/DL configuration 1, and network 24B uses UL/DL configuration 2. These two configurations have a periodicity of five sub-frames (SF), and therefore only the first five sub-frames of the frame are shown in the figure.

As can be seen in the figure, sub-frame SF3 of configuration 48 is an uplink sub-frame, but sub-frame SF3 of configuration 52 is a downlink sub-frame. The same occurs in sub-frame SF8. In this sub-frame, a victim terminal of network 24B (using configuration 52) is susceptible to strong interference from nearby aggressor terminals of network 24A (that use configuration 48).

The interference from an aggressor terminal to a nearby victim terminal may be caused by various mechanisms. For example, the aggressor terminal is typically allowed to generate spurious emissions outside its allocated bandwidth. Some of the spurious emissions may fall within the bandwidth of the victim terminal. In TD-LTE, for example, the allowed power level of the spurious emissions is specified in "$3^{rd}$ Generation Partnership Project; Technical Specification Group Radio Access Network; Evolved Universal Terrestrial Radio Access (E-UTRA); User Equipment (UE) Radio Transmission and Reception (Release 10)," 3GPP TS 36.101, version 10.2.1, April 2011, which is incorporated herein by reference.

When the aggressor terminal and the victim terminal are located in close proximity to one another, the power level of the spurious emissions received in the victim terminal may be considerably higher than the received level of the desired downlink signal, and therefore downlink reception may be blocked.

As another example, the uplink signal transmitted by the aggressor terminal may be received with relatively high power at the victim terminal. This signal is typically filtered-out at the victim terminal receiver only after some amplification and mixing stages. These stages (e.g., a low-noise amplifier) typically have limited linearity and may saturate because of the high power level of the aggressor terminal uplink signal.

In other cases, if the aggressor uplink signal is detected by the victim terminal, the latter may reduce its receiver gain in order to avoid saturation. In this case, however, the noise figure of the receiver may be severely degraded and low-power desired downlink signals may not be decoded properly by the victim terminal. The 3GPP TS 36.101 specification, for example, requires the terminal to handle adjacent channel aggressors with power levels of up to 27-33 dB above the received downlink signal power (in which case the terminal's sensitivity requirements are reduced considerably, to reflect the degradation in noise figure). The received uplink signal power of a nearby aggressor terminal may be well above this ratio.

The impact of interference between terminals is particularly severe if the affected downlink sub-frame carries synchronization signals that are used for network acquisition. TD-LTE systems typically use two types of synchronization signals—A Primary Synchronization Signal (PSS) located at sub-frames SF1 and SF6, and a Secondary Synchronization Signal (SSS) located at sub-frames SF0 and SF5.

When two base stations use UL/DL configurations 1 and 2, the affected sub-frames are sub-frames SF3 and SF8 (as explained above regarding FIG. 2A). In UL/DL configuration 2, only sub-frames SF3 and SF8 can carry control messages for uplink grants for uplink transmissions in sub-frames SF7 and SF2, respectively (using DCI or negative HI). Since sub-frames SF7 and SF2 are the only uplink sub-frames in UL/DL configuration 2, blocking downlink sub-frames SF3 and SF8 effectively blocks any uplink transmission.

Minimizing Interference Between Wireless Terminals Using Time Offset Between UL/DL Patterns In some embodiments, base stations 28A (of network 24A) synchronize to the timing of base stations 28B (of network 24B) while applying a certain time offset. The time offset is selected so as to minimize the impact of the interference between terminals 32A and terminals 32B. The term "minimizing the impact of interference" means that the selected time offset results in the lowest interference impact among the various possible time offsets, with sub-frame resolution. The impact of the interference may refer to the level of interference itself, or to performance degradation caused by the interference, such as blocking of critical control messages or synchronization signals. Typically, the selected time offset aims to minimize the overlap between the downlink sub-frames of one UL/DL configuration and the uplink sub-frames of the other UL/DL configuration.

FIG. 2B is a diagram that schematically illustrates example UL/DL configurations, in accordance with an embodiment of the present invention. The example of FIG. 2B shows UL/DL configurations 56 and 60, which are used by networks 24A and 24B, respectively. In this example too, network 24A uses UL/DL configuration 1, and network 24B uses UL/DL configuration 2.

Unlike FIG. 2A above, however, in the scheme of FIG. 2B there is an offset of one sub-frame (1 ms) between the frames of network 24A and the frames of network 24B. Thus, SF0 of network 24A (configuration 56) coincides with SF9 of network 24B (configuration 60), SF1 of network 24A coincides with SF0 of network 24B, SF2 of network 24A coincides with SF1 of network 24B, and so on.

In the case of UL/DL configurations 1 and 2, this offset of one sub-frame minimizes the interference between terminals 32A and terminals 32B. As can be seen in the figure, an uplink sub-frame (U) of one configuration never coincides with a downlink (D) sub-frame of the other.

Network 24A and/or 24B may select and apply the appropriate time offset in any suitable way. In the embodiment of FIG. 1 above, timing unit 44 of each base station 28A synchronizes the timing of the base station while applying the selected time offset. Synchronization between networks 24A and 24B may be set, for example, by receiving downlink signals of one network by a receiver in the other network, and synchronizing to the received downlink signals. As another example, both networks may synchronize to a common time base, such as a Global Positioning System (GPS) clock. On top of such synchronization, the base stations of one network apply the selected time offset for minimizing interference.

FIG. 3 is a flow chart that schematically illustrates a method for synchronization between base stations, in accordance with an embodiment of the present invention. The method begins by selecting a time offset between the respective UL/DL configurations of network 24A and network 24B, at an offset selection step 70.

The time offset is typically selected off-line based on the knowledge of the UL/DL configurations used in the two networks. The selected time offset minimizes the interference between nearby terminals of the two networks, as explained above.

Timing units 44 of base stations 28A apply the selected time offset, at an offset application step 74. The timing units synchronize the frame timing of base stations 28A to the frame timing of base stations 28B, and further apply the selected time offset. After synchronization, networks 24A and 24B operate synchronously with one another while applying the additional time offset. Thus, interference between terminals 32A and terminals 32B is minimized.

Although the embodiments described herein mainly address interference reduction between UL/DL configurations 1 and 2 of the TD-LTE specification, the disclosed techniques can be used in a similar manner to reduce interference between any other pair of alternating UL/DL patterns.

Mitigating Residual Interference in Special Sub-Frames

Although the selected time offset in FIG. 2B eliminates (or at least minimizes) interference from uplink sub-frames to downlink sub-frames, some interference may still occur during the special sub-frames (S). For example, the DwPTS regions of sub-frames SF1 and SF6 (of UL/DL configuration 60) are affected by uplink sub-frames SF2 and SF7 (of UL/DL configuration 56), respectively. Although sub-frames SF1 and SF6 do not contain uplink grants, they do contain the PSS and may also contain DL allocations. Therefore, when an aggressor terminal transmits during these sub-frames, the PSS may suffer from interference.

As another example, downlink sub-frames SF0 and SF5 (of UL/DL configuration 60) are affected by the UpPTS regions of special sub-frames SF1 and SF6 (of UL/DL configuration 56), respectively. The UpPTS regions may cause interference to the last one or two Orthogonal Frequency Division Multiplexing (OFDM) symbols of the sub-frame (thus the control region is typically unaffected).

Note that the last symbol of sub-frames SF0 and SF5 includes the SSS. Note also that the UpPTS region is used for PRACH and for Sounding Reference Signals (SRS). When a terminal is configured to transmit SRS, the transmission is typically configured with a periodicity of five or ten sub-frames. Thus, when a nearby aggressor terminal is configured to transmit SRS in the last symbol of sub-frames SF1 and SF6

(five-sub-frame periodicity), the SSS of the victim terminal is subject to constant interference.

In various embodiments, the victim terminal may mitigate the interference to reception of the PSS in different ways, or acquire network synchronization using other means irrespective of the PSS. For example, processor 47 in the victim terminal may continually attempt to acquire the PSS until acquisition is successful. In many practical cases, the aggressor terminal will not transmit in every sub-frame SF2 and SF7. As a result, the victim terminal will have remaining opportunities to receive the PSS without interference. This solution may require, for example, setting an appropriately high acquisition time in processor 47 of the victim terminal, and/or apply means to detect and exclude from calculations sub-frames that suffer from interference.

Nevertheless, in some relatively rare cases, the aggressor terminal may transmit in each PSS sub-frame. For example, the aggressor terminal may be configured to transmit data with Semi-Persistent Scheduling (SPS) having a period of ten sub-frames in sub-frame SF2 and periodic Channel Quality Indicator (CQI) in sub-frame SF7. In such a case, all PSS signals received by the victim terminal will typically be subject to interference. However, the transmission bandwidth and transmission power for CQI reports are typically low. Therefore, PSS detection in the victim terminal has a high probability of success.

In alternative embodiments, processor 47 in the victim terminal may attempt to acquire network synchronization by acquiring the PSS of the aggressor network, and then deducing the timing of the victim network from the aggressor network timing. The PSS of the aggressor network is transmitted in sub-frame SF1 and SF6 of the aggressor signal that coincide with sub-frames SF0 and SF5, respectively, of the victim signal. Since sub-frames SF0 and SF5 are downlink sub-frames in the victim network, the PSS of the aggressor network can be retrieved without uplink interference from the victim signal. Since both signals are synchronized (within several µsec reflecting the path length difference), once the victim terminal acquired the aggressor network frame timing, it has also acquired the victim network frame timing (taking into account the one-sub-frame time offset).

In another embodiment, processor 47 in the victim terminal may calculate an autocorrelation of the received signal, which is given by:

$$y_n = \sum_{m=n}^{n+M} x_m \cdot x^*_{m+N}$$

wherein M denotes the Cyclic Prefix (CP) length and N denotes the OFDM symbol length (without CP). The output of the autocorrelation typically comprises peaks corresponding to the timing of the OFDM symbols. Processor 47 in the victim terminal may analyze the pattern of these peaks to acquire the downlink frame timing of the victim network, taking into account the UL/DL configuration and the non-uniform OFDM symbol spacing used in LTE.

In other embodiments, the victim terminal may reject the interference from the aggressor using spatial techniques. When the victim terminal comprises multiple receive antennas, processor 47 in the victim terminal can use spatial ("smart antenna") techniques to reject the interference. For example, the processor may calculate weights for application to the respective receive antennas based on analysis of the received signal. Alternatively, the processor may scan over sets of weights, effectively steering the reception beam to different directions, until finding a setting that rejects the interference.

Additionally or alternatively, processor 47 in the victim terminal may mitigate the interference to reception of the SSS in different ways, or acquire network synchronization using other mean irrespective of the SSS. As noted above, SSS reception suffers particularly from SRS that are transmitted in the last OFDM symbol of sub-frames SF1 and/or SF6 of the aggressor terminal signal. The bandwidth and periodicity of the SRS (typically five or ten sub-frames) are configured by the aggressor network.

When the periodicity of the SRS is ten sub-frames (e.g., when SRS is transmitted only in sub-frame SF1), the victim terminal may receive every second SSS without interference (the SRS transmitted in sub-frame SF5 in this example). Processor 47 in the victim terminal may detect this scenario, ignore the SSS sub-frames that suffer from interference, and decode the SSS based only on the interference-free sub-frames.

When the SRS bandwidth is configured to be relatively narrow, its impact on the victim terminal is typically small, and SSS detection in the victim receiver is often successful. However, acquisition time in processor 47 may need to be increased to improve processing power over the interference.

The worst-case scenario typically occurs when the SRS is wideband and is transmitted with a periodicity of five sub-frames. In this case, SSS reception in the victim terminal can be blocked completely. In some embodiments, processor 47 in the victim terminal may acquire network synchronization by receiving Cell-Specific Reference Signals (CS-RS) instead of SSS. The CS-RS can provide the information obtained by SSS processing—Cell ID identification and resolution of the half-frame ambiguity that remains after PSS processing. Acquisition time may increase in this embodiment (in comparison with SSS processing). In an embodiment, processor 47 in the victim terminal detects the fact the SSS reception is blocked, and initiates CS-RS based processing. In an embodiment, CS-RS based acquisition comprises cross-correlation with CS-RS sequences.

In the scheme of FIG. 2B above, sub-frames SF0, SF1, SF5 and SF6 of the victim terminal (that uses UL/DL configuration 60) may suffer from interference from the aggressor terminal (that uses UL/DL configuration 56). In sub-frames SF0 and SF5 the interference occurs only in the last one or two OFDM symbols, depending on the special sub-frame configuration in the aggressor network). In sub-frames SF1 and SF6 the interference may span the entire DwPTS region.

In various embodiments, the victim base station and/or the victim terminal may mitigate this interference in different ways. For example, the victim base station may avoid allocating downlink transmissions in the interfered sub-frames, especially in sub-frames SF1 and SF6.

As another example, the victim base station may select the transmission scheme, e.g., the Modulation and Coding Scheme (MCS), for these sub-frames to be robust enough to mitigate the interference. As yet another example of transmission scheme selection, the victim base station may use in sub-frames SF0 and SF5 downlink allocations comprising a small number of Resource Blocks (RB). This solution ensures that reception of the last Code Block (CB) in any LTE Transport Block (TB) will not be blocked completely. In another embodiment, the victim base station may allocate Physical Resource Blocks (PRB) at frequencies that are as far as possible from the frequency of the aggressor signal.

As yet another example, the victim base station may apply sub-band CQI reports (a mechanism supported in TD-LTE), as opposed to a single wideband CQI report for the entire frequency band. The interference level is typically non-uniform over the victim signal bandwidth (typically decreasing as drawing away from the frequency of the interfering signal). Therefore, sub-band CQI reports are likely to improve link adaptation.

In still another embodiment, victim base station may apply separate processing to CQI reports of sub-frames that potentially suffer from interference (SF0, SF1, SF5 and SF6 in this example) and CQI reports of interference-free sub-frames. In LTE, each CQI report is based on a downlink sub-frame that is located a known number of sub-frames before the sub-frame comprising the report (see 3GPP TS 36.213, section 7.2.3). Thus, for each CQI report, the victim base station is able to decide whether the report was calculated over a sub-frame that is potentially subject to interference or not. By applying separate processing (e.g., separate link adaptation) to potentially-interfered and interference-free sub-frames, the impact of the interference can be mitigated.

Other interference mitigation schemes may be applied by the victim terminal. In these embodiments, processor 47 of the victim terminal is able to detect an interference event and activate one or more of the following interference mitigation techniques. In one embodiment, processor 47 applies spatial processing techniques to null out or at least attenuate the interference. Typically although not necessarily, this solution is most useful when the downlink transmission to the victim terminal is in rank 1, i.e., comprises a single spatial stream.

In another embodiment, processor 47 in the victim terminal may adapt its receiver chain to account for the interference. In one embodiment, the receiver chain is set to a normal setting during interference-free sub-frames and to an interference-mitigation setting during potentially-interfered sub-frames. Parameters of the receiver chain that differ between the two settings may comprise, for example, the baseband filter bandwidth (narrower in potentially-interfered sub-frames), or the gain setting of amplifiers and/or mixers (lower gain in potentially-interfered sub-frames, especially low-noise amplifier gain). As another example, noise and interference measurements in the receiver (e.g., for the purpose of optimizing the detector and generating reports) may be aware of the interference and performed separately per sub-frame and per sub-band or RB. As yet another example, receiver tracking loops, such as frequency, gain or timing loops, may be aware of the interference characteristics and ignore (or at least weight differently) sub-frames with potential interference.

Other interference mitigation techniques are applied by the aggressor base station and/or aggressor terminal. For example, the aggressor base station may reduce the maximal uplink transmit power of the aggressor terminal in order to reduce the interference to the victim terminal. For example, the aggressor base station may apply Additional Maximal Power Reduction (A-MPR) by defining a specific Network Signaling (NS) value for this case, as described in 3GPP TS 36.101, section 6.2.4. In an embodiment, the A-MPR may be applied only in the potentially-interfered sub-frames (SF0, SF1, SF5 and SF6 in the present example), based on the specific NS As another example, the aggressor base station may allocate narrow uplink grants in the potentially-interfering sub-frames. As yet another example, the out-of-band spurious emissions of the aggressor terminal may be reduced beyond the requirements of the applicable standard.

The interference mitigation techniques described above were chosen purely by way of example. In alternative embodiments, the victim terminal, victim base station, aggressor terminal and/or aggressor base station may apply any other suitable technique for this purpose.

Although the embodiments described herein mainly address interference reduction between wireless communication terminals, the methods and systems described herein can also be used for reducing interference between nearby base stations that use different alternating patterns of uplink and downlink time intervals. The same time offsets that minimize interference between terminals also minimize interference between base stations, since they avoid scenarios in which a base station receives while a nearby base station transmits. Alternatively, interference between base stations can be mitigated by applying appropriate filtering at the aggressor base station transmit path and/or the victims base station receive path.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   communicating between one or more first base stations and first wireless communication terminals using a first alternating pattern of downlink time intervals and uplink time intervals;
   selecting a time offset between the first alternating pattern and a second alternating pattern that is used by one or more second base stations for communicating with second wireless communication terminals, so as to minimize impact of interference between the first and second wireless communication terminals; and
   synchronizing the first base stations relative to the second base stations according to the selected time offset,
   wherein each of the first and second alternating patterns comprises one or more uplink sub-frames, one or more downlink sub-frames, and one or more special sub-frames containing respective uplink and downlink regions, and comprising applying an interference mitigation process to reduce the interference during the special sub-frames, and
   wherein applying the interference mitigation process comprises distinguishing between a first subset of the special sub-frames that are subjected to the interference and a second subset of the special sub-frames that are not subjected to the interference, and performing at least one of:
     processing only the special sub-frames in the second subset; and
     activating the interference mitigation process only during the special sub-frames in the first subset.

2. The method according to claim 1, wherein the first and second alternating patterns are specified in accordance with a Time-Division Long-Term Evolution (TD-LTE) specification, and wherein the downlink time intervals and the uplink time intervals comprise TD-LTE sub-frames.

3. The method according to claim 1, wherein each of the first and second alternating patterns comprises one or more uplink sub-frames and one or more downlink sub-frames, and wherein selecting the time offset comprises minimizing an overlap between the uplink sub-frames in one of the first and second alternating patterns and the downlink sub-frames in the other of the first and second alternating patterns.

4. The method according to claim 1, wherein the special sub-frames contain synchronization signals, and wherein applying the interference mitigation process comprises reducing the interference to the synchronization signals.

5. The method according to claim 1, wherein the special sub-frames contain synchronization signals, and wherein applying the interference mitigation process comprises obtaining synchronization using alternative means other than the synchronization signals.

6. The method according to claim 1, wherein a given wireless communication terminal comprises multiple receive antennas, and comprising canceling the interference by weighting respective signals received via the multiple receive antennas.

7. The method according to claim 1, and comprising allocating data transmissions to the first terminals only during predefined times during the first alternating pattern in which the interference from the second alternating pattern is known not to be present.

8. The method according to claim 1, and comprising communicating with the first terminals using a first communication scheme during predefined times in the first alternating pattern in which the interference from the second alternating pattern is known to be present, and using a second communication scheme, less robust than the first scheme, outside the predefined times.

9. The method according to claim 1, and comprising setting in the first terminals a first receiver chain setting during predefined times in the first alternating pattern in which the interference from the second alternating pattern is known to be present, and setting a second receiver chain setting, less robust than the first setting, outside the predefined times.

10. A wireless communication terminal, comprising:
a transceiver, which is configured to communicate with a first base station using a first alternating pattern of downlink time intervals and uplink time intervals, wherein the first alternating pattern is synchronized relative to a second alternating pattern that is used by a second base station for communicating with at least another wireless communication terminal while applying between the first and second patterns a time offset selected so as to minimize impact of interference between the terminal and the other terminal; and
a processor, which is configured to apply an interference mitigation process for reducing residual interference caused by the second pattern, wherein each of the first and second alternating patterns comprises one or more uplink sub-frames, one or more downlink sub-frames, and one or more special sub-frames containing respective uplink and downlink regions, and wherein the processor is configured to apply the interference mitigation process during the special sub-frames, to distinguish between a first subset of the special sub-frames that are subjected to the interference and a second subset of the special sub-frames that are not subjected to the interference, and to perform at least one of:
processing only the special sub-frames in the second subset; and
activating the interference mitigation process only during the special sub-frames in the first subset.

11. The terminal according to claim 10, wherein the first and second alternating patterns are specified in accordance with a Time-Division Long-Term Evolution (TD-LTE) specification, and wherein the downlink time intervals and the uplink time intervals comprise TD-LTE sub-frames.

12. The terminal according to claim 10, wherein the special sub-frames contain synchronization signals, and wherein the processor is configured to reduce the residual interference to the synchronization signals by applying the interference mitigation process.

13. The terminal according to claim 10, wherein the special sub-frames contain synchronization signals, and wherein the processor is configured to obtain synchronization with the first base station using alternative means other than the synchronization signals.

14. The terminal according to claim 10, and comprising multiple receive antennas, wherein the processor is configured to cancel the residual interference by weighting respective signals received via the multiple receive antennas.

15. The terminal according to claim 10, wherein the processor is configured to cause the transceiver to communicate with the first base station using a first communication scheme during predefined times in the first alternating pattern in which the residual interference from the second alternating pattern is known to be present, and using a second communication scheme, less robust than the first scheme, outside the predefined times.

16. The terminal according to claim 10, wherein the processor is configured to set in the transceiver a first receiver chain setting during predefined times in the first alternating pattern in which the interference from the second alternating pattern is known to be present, and to set a second receiver chain setting, less robust than the first setting, outside the predefined times.

* * * * *